(12) United States Patent
Knox

(10) Patent No.: US 11,976,637 B1
(45) Date of Patent: May 7, 2024

(54) VARIABLE BUOYANCY RENEWABLE POWER GENERATOR

(71) Applicant: James Arthur Knox, Houston, TX (US)

(72) Inventor: James Arthur Knox, Houston, TX (US)

( * ) Notice: Subject to any disclaimer, the term of this patent is extended or adjusted under 35 U.S.C. 154(b) by 0 days.

(21) Appl. No.: 17/705,296

(22) Filed: Mar. 26, 2022

(51) Int. Cl.
  *F03D 9/00* (2016.01)
  *H02K 7/10* (2006.01)
  *H02K 7/18* (2006.01)

(52) U.S. Cl.
  CPC ............. *F03D 9/008* (2013.01); *F03D 9/007* (2013.01); *H02K 7/1004* (2013.01); *H02K 7/1853* (2013.01); *F05B 2220/708* (2013.01)

(58) Field of Classification Search
  CPC ....... F03D 9/008; F03D 9/007; H02K 7/1004; H02K 7/1853; F05B 2220/708
  See application file for complete search history.

(56) References Cited

U.S. PATENT DOCUMENTS

2009/0236856 A1\* 9/2009 Jin ........................... F03G 7/00
                                                              290/54

\* cited by examiner

*Primary Examiner* — Viet P Nguyen

(57) ABSTRACT

A novel renewable energy system where ambient temperatures at the surface or lower altitudes evaporate an enclosed material and create a buoyant force on the system. The buoyant system ascends and produces power. At high altitudes, the lower ambient temperature condenses the material, removing the buoyant force. The system descends to ground level, and begins the evaporation phase, starting the cycle over again.

8 Claims, 10 Drawing Sheets

VARIABLE BUOYANCY RENEWABLE POWER GENERATOR

FIELD

The field of this invention is renewable power generation.

BACKGROUND OF THE INVENTION

Power consumption continues to increase worldwide. Traditional methods of power generation are becoming more expensive due to resource constraints on fossil fuels and demand for greenhouse gas reductions. Renewable options, such as photovoltaic panels, wind turbines, hydroelectric, and biomass, are well developed and available, but each has limitations on implementation and cost effectiveness. Solar is dependent on solar radiation, so no power is generated at night. Wind is limited to when the wind is blowing and constrained to regions with sufficient wind velocity to support investment. Wind is also often available during non-peak hours creating impacts on power grid management or requiring energy storage mechanisms. Hydroelectric is constrained to specific areas and biomass is constrained by availability, shipping costs, and low efficiency. Renewable power production variability often requires a fossil fuel backup to meet demand. Power storage options are being developed, such as molten salt systems and batteries, but these add significantly to the cost of power.

One option for renewable energy is the temperature gradient created by solar irradiation and the density gradient of the atmosphere. The troposphere is the lowest layer of the atmosphere. This is the layer where most weather takes place and ranges from 7 to 14 kilometers above the earth's surface depending on the season and latitude. In this layer, air pressure and density rapidly decrease with height, and temperature generally decreases with height at a constant rate. The change in temperature with height is known as the lapse rate. Lapse rate varies by season and latitude. The tropospheric lapse rate for January is about 5.9 K/km in the Northern Hemisphere. The lapse rate is higher over the oceans and decreases in higher latitudes and in winter. The lapse rate value has a maximum value for the Northern Hemisphere as a whole in August (7.0 K/km) and minimum (3.5 K/km) in January.[1]

The daily temperature difference between the surface and higher altitudes is at its maximum during the day as the sun heats the Earth surface. The heated air rises, and air temperatures increase in the lower portion of the troposphere. At night the surface rapidly cools, and the lapse rate reduces to zero or reverses. This reduction in the lapse rate occurs up to a certain altitude which is dependent on temperature differential and wind. Above this altitude the average lapse rate is still present. In humid climates or over water the lapse rate reduces at night but does not become negative. Representative lapse rates for the Southern United States are shown in FIG. 1.

Some prior renewable energy systems utilize the atmospheric temperature and pressure gradient to produce power. U.S. Pat. No. 4,275,309 utilizes a method and apparatus, commonly called a solar tower, to convert solar heat to electrical energy by accumulating normally non-heated air under a large transparent roof. Solar energy heats the entrapped air causing it to become buoyant. Hot air is directed though a tower generating air flow that is used to power wind turbines. This concept has been tested at a pilot plant in Manzanares, Ciudad Real. The negative of this system is the high cost of the tower and the requirement for solar heating. This system can only be used at night if solar energy is thermally stored and used to heat the air used at night, adding to the cost of power.

Other systems have been developed that utilize lighter than air (LTA) balloons to produce power. LTA balloons have a net buoyant force due to the low-density gas used in the balloon. This force can be used to generate power.

One of the aspects of Patent US 20100107627 A1 uses LTA balloons to store energy and produce power in a manner like hydroelectric energy storage or compressed air energy storage. Electrical power during non-peak usage is used to reel in LTA balloons. The balloons are tethered to an electrical generator and held at ground level until power is needed. When released the balloon's buoyant force, transferred through the tether, turns the generator and produces electricity or mechanical energy. The stored energy can be released to produce power on demand. This system is a form of renewable energy storage but is not a method of renewable energy production.

Ian Edmonds proposed a hot air balloon utilizing a thermal concentrator on the surface to heat air. Hot air fills a large balloon. As the balloon rises it pulls a tether connected to a generator. When the balloon reached the targeted altitude, the hot air is released, and the balloon returns to earth. Some energy is used to reel in the balloon. This concept is like a thermal chimney, except the hot air is contained initially and power is harvested through a generator using a tether and rather than an air turbine. Patent FR2803884A1 proposed a similar solution, filling a balloon with solar heated air and generating power from the buoyant accent, but with helium or hydrogen balloons to assist in assent. Both options require solar heating and are therefore dependent on the diurnal solar cycle and cannot generate energy during the night unless some method of thermal energy storage is employed.

The present invention provides a method to utilize the temperature differential present in the earth's atmosphere to condense and evaporate a material with a boiling point near the atmospheric temperatures where the invention is utilized. The apparatus containing the material, called the variable buoyancy module or VBM, is the key component of the system. The VBM contains the material, prevents leakage, and maintains the material at a constant pressure and therefore a constant boiling point. The VBM allows the material to expand and contract and to displace atmospheric air. At warm temperatures in the lower atmosphere the material expands and displaces ambient air. This displacement creates a positive buoyant force on the VBM equal to the mass of the displaced air per Archimedes principle. This force is insufficient to cause the VBM to float directly, but with counterweighting or use of a LTA balloon, the VBM is balanced such that it will rise when the material is evaporated and descend when condensed. This force is harnessed to produce renewable energy.

The system utilizes the temperature and density gradient of the troposphere to generate power.

The purpose of this invention is to develop a renewable power solution offering cost effective renewable energy with minimal diurnal and seasonal impacts.

BRIEF SUMMARY OF THE INVENTION

Embodiments of the present invention, related to the apparatus and methods to produce renewable energy, utilize air at ambient temperatures on the ground or at low altitudes as the heat source and air at ambient temperatures at high altitude as the heat sink. Embodiments of the invention take advantage of the reduction in atmospheric temperature with increasing altitude or the "Lapse Rate".

The system contains an apparatus such that there is a positive buoyant force on the apparatus at warm low altitudes causing it to ascend and a neutral or negative buoyant force on the apparatus at cold high altitudes. This variable buoyant force can be used to generate power as the apparatus cycles between high and low altitudes.

Variable buoyancy is generated using an apparatus called the variable buoyancy module or VBM; a hermetically sealed container filled with a material held at a constant pressure such that the boiling point of the material is less than the low altitude temperature but above the high-altitude temperature. The VBM allows the material to expand and contract as it evaporates and condenses. The device also allows atmospheric air to be displaced during the expansion and contraction.

Archimedes' principle allows the calculation of the buoyancy of an object immersed in a fluid. The downward force on the object is its weight. The upward, or buoyant force on the object is equal to the weight of the fluid displaced by the object. The net force on the object is the difference between the buoyant force and its weight. If this net force is positive, the object rises; if negative, the object sinks; and if zero, the object is neutrally buoyant and remains in place without either rising or sinking. In this manner the buoyant force on the VBM varies as the contained material expands and contracts and the atmospheric air surrounding it is displaced.

Options for the contained material include, but are not limited to, liquified petroleum gases, freons, and ammonia. FIG. 2 shows the NIST saturate curve for butane showing that the transition temperature between vapor and liquid can be varied to match the average air temperatures shown in FIG. 1 by adjusting the pressure of the butane. As an example, a butane boiling point of 292 Kelvin, the summer surface low, can be achieved with a pressure of 0.2 Megapascals or 29 psi. In addition to pressure variations, blending of components such as propane, isobutane, and pentane can be used to adjust the boiling point of the material to match regional temperatures at a relatively low pressure.

The materials suitable for the VBM, even without the weight of the apparatus, have insufficient buoyant force when evaporated to overcome their own weight in atmospheric air. For this reason, a counterweight for the VBM weight is required such that the VBM rises when evaporated and descends when condensed. This is accomplished in the preferred embodiment of the invention by using a set of pullies and a continuous wire loop. The upper pully will be held at high altitude using an LTA balloon and the lower pully suspended using the wire loop at the lower altitude target and secured to the ground. The buoyant force of the LTA balloon is sufficient to maintain the wire loop taunt and coupled to the two pulleys, such that if a force is applied to the wire loop, the loop and both pulleys will rotate. Pairs of VBMs are placed at opposite midpoints of the wire loop such that when one VBM is at the bottom the other VBM is at the top. VBMs at high altitude will be condensed and have no buoyant force and VBMs at the bottom will be expanded and have a buoyant force. When on opposite sides of the upper pulley, the condensed VBM counterweights the evaporated VBM, making the two neutrally buoyant if the buoyant force is ignored. Due to the buoyant force on the lower VBM, the VBM ascends, rotating the wire loop and causing the upper VBM to descend. Multiple pairs of VBMs can be attached to the wire loop increasing the overall buoyant force.

The lower pully is connected to a rotating generator or mechanical driver. As the VBMs ascend, the generator is rotated and alternating current electricity or power is generated.

The velocity of the ascent and descent will be controlled to allow time for condensation and evaporation of the VBMs when at the target altitudes. Insulation may also be applied to the VBMs during their ascent and descent to prevent premature phase change that would reduce system efficiency.

In the preferred embodiment, the VBMs could be decoupled from the wire loop, or parked, at the upper and lower altitudes until phase transition is complete and until needed to support power production requirements. When required the VBM pair would be reattached and begin their ascent and descent. This method allows additional time for phase change and stores energy within the system until required to meet peak demand or to restart the system.

In another embodiment of the invention an LTA balloon is directly attached to the VBM such that the VBM and balloon together, or variable buoyancy balloon (VBB), will have a net positive buoyant force when the VBM is fully expanded and a net negative buoyant force when the VBM is collapsed.

In this embodiment, during the positive buoyancy cycle, electrical or mechanical power can be generated by tethering the VBB directly to a generator or driver. At high altitude the evaporated material will condense, and the VBB will return to ground level. Some power will need to be utilized to reel in the tether and VBB, but minimal power is needed since the VBB is no longer buoyant and would descend regardless. After returning to ground level the material will be heated by ambient air and evaporate, starting the process over again. Multiple VBBs can be connected to one generator to generate continuous power, with one or more VBBs generating power while the others are in the non-buoyant phase and descending or undergoing evaporation.

Depending on the location or embodiment utilized, the invention can produce energy at all times of the day and is not restricted by diurnal or seasonal effects.

DETAILED DESCRIPTION OF THE INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention.

Descriptions of specific applications are provided only as representative examples. Various modifications to the preferred embodiments will be readily apparent to one skilled in the art, and the general principles defined herein may be applied to other embodiments and applications without departing from the scope of the invention.

In case of conflict, the present specification, including definitions, will control. Following long-standing patent law convention, the terms "a", "an" and "the" mean "one or more" when used in this application, including in the claims.

Unless otherwise indicated, all numbers expressing quantities of materials, thermal conditions, and so forth used in the specification and claims are to be understood as being modified in all instances by the term "about".

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

The present invention provides a novel design for generating power using low altitude temperatures as a heat source and high-altitude temperatures as a heat sink. The core of the system is the variable buoyancy module or VBM. The VBM is a sealed container filled with a material held at a constant pressure such that the boiling point of the material is less than the low altitude air temperature but above the high-altitude air temperature. The VBM allows the material to expand and contract as it boils and condenses. The device also allows atmospheric air to be displaced during the expansion and contraction.

Figure 1:
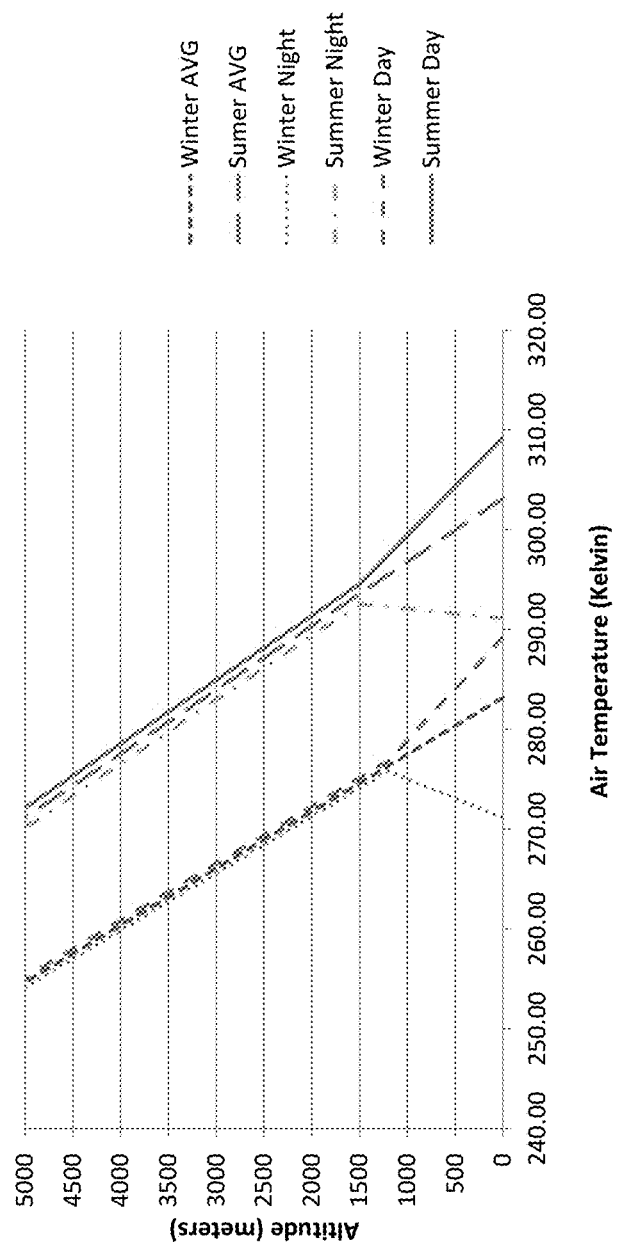
FIG. 1 is a representative graph of atmospheric air temperature by altitude in the Southern United States, for night and day and Summer and Winter.
Figure 2:
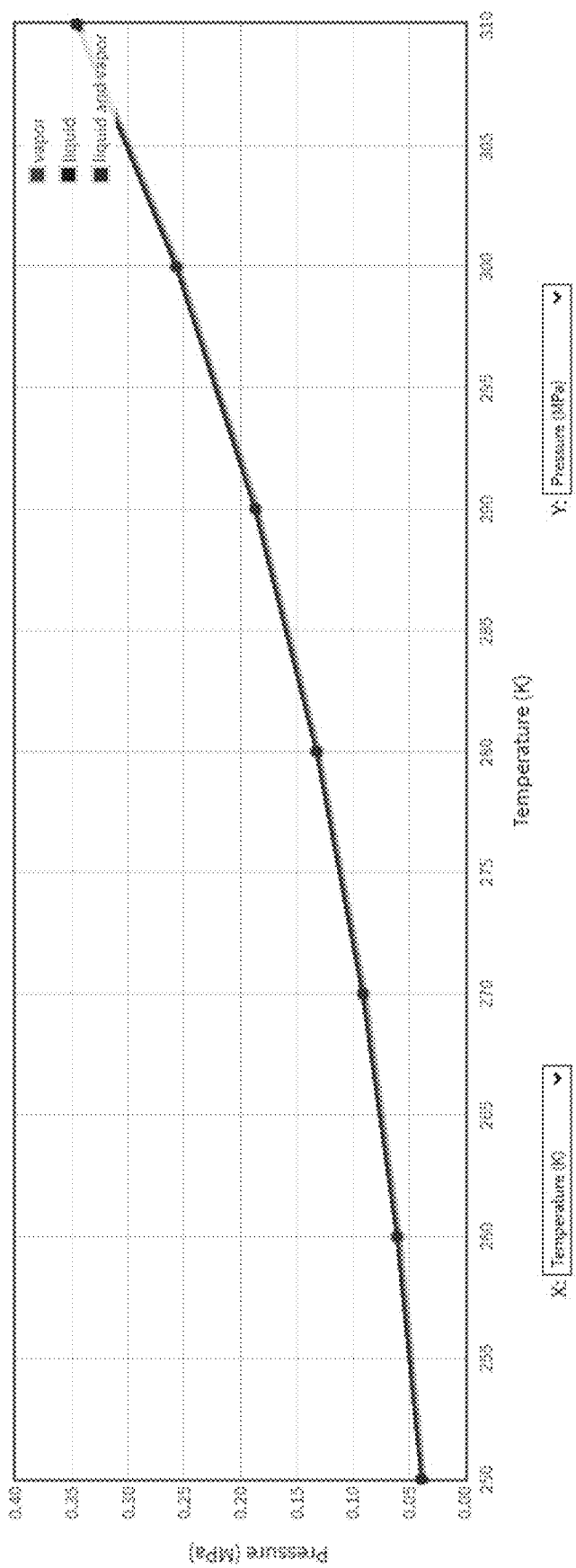
FIG. 2 is a representative graph showing the phase diagram for butane between 250 and 310 Kelvin.
Figure 3:
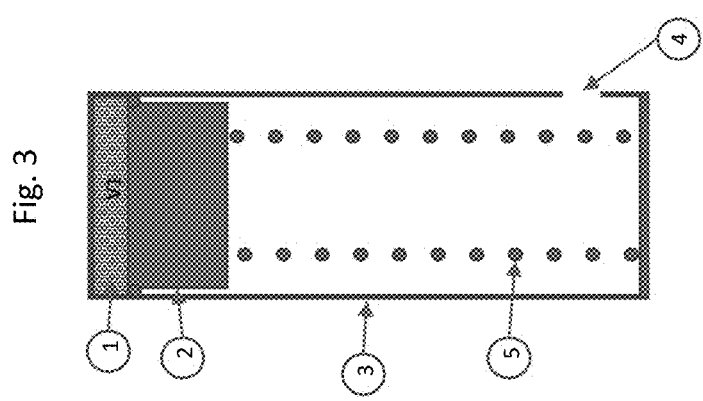
FIG. 3 is a representative figure showing an example of a piston design for the VBM in a condensed state.

An example of a VBM apparatus is a piston and cylinder where one side of the cylinder is sealed the other open. The condensed stage of the VBM is represented in a simplified schematic in FIG. 3. The material 1 to evaporate is contained between the piston 2 and closed end of the cylinder 3. The other side of the cylinder 3 is open to the environment through a vent 4. A spring 5 positioned between the piston 2 and closed end of the cylinder 3 is used to apply a constant force on the piston 2, maintaining a constant spring 5 pressure on the contained material 1 whether in vapor or liquid form. Since the spring 5 side of the cylinder 3 is open to the atmosphere, variations in air pressure will also impact the piston 2 force on the material 1. For this reason, higher material 1 pressures are preferred to minimize the impact of ambient air pressure variations during ascent and descent.

Figure 4:
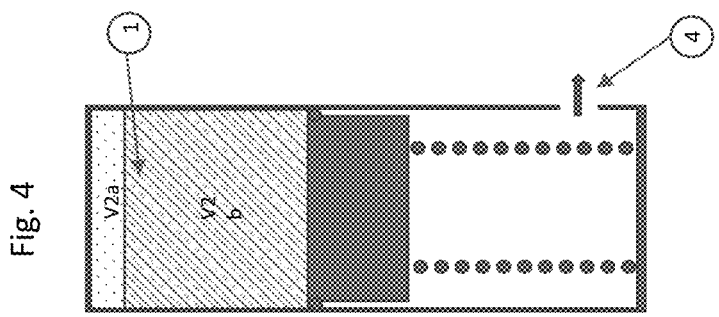
FIG. 4 is a representative figure showing an example of a piston design for the VBM in an evaporated state.

As the piston 2 moves with the expansion and contraction of the contained material 1, air is displaced through the vent 4 in the cylinder 3. FIG. 4 represents the evaporated stage of the VBM. The expanded material 1 volume is equal to V2$a$, which is the original liquid volume, and V2$b$, which is the additional expanded volume. The volume of V2$b$ is the volume of displaced air vented through the vent 4. Per Archimedes principle, the weight of this displaced air is equal to the buoyant force exerted on the VBM.

Multiple options exist for the contained material 1, including but not limited to liquified petroleum gases, freons, and ammonia. As an example, the pressure of the contained material 1 is set such that the boiling point of the contained material 1 is approximately the average of the hot lower altitude temperature and the cold higher altitude temperature. Since the lapse rate is relatively constant, the altitude where this midpoint temperature occurs is the midpoint between the high and low altitude targets.

Additional options can be incorporated into the VBM design to improve operations. Other non-exhaustive examples of VBM designs include a diaphragm, bellows, or elastomeric bladder. One option is to adjust the pressure applied to the VBM's contained material 1 during operation using stored energy to enable phase change at a lower or higher temperature. This can allow operation of the system in circumstances where the environment has temporarily changed and does not support operation. In this manner stored energy can be used to maintain the proper operation of the system during transient environmental changes or if the system needs to be secured for maintenance or severe weather. Material selection can also be used to enhance operations. In a bellows or diaphragm design, if the body were made of a material with a high thermal expansion coefficient, the contraction of the body in cold air would increase contained material 1 pressure and accelerating phase change if desired.

In all embodiments the pressure on the contained material and the material can be adjusted to compensate for changes in seasonal and regional ambient temperatures and allow efficient operations.

The buoyant force created by the expansion of material 1 is insufficient to overcome the weight of the VBM and generate lift and power. For this reason, a counterweight for the VBM weight is required such that the VBM rises when evaporated and descends when condensed.

Figure 5:
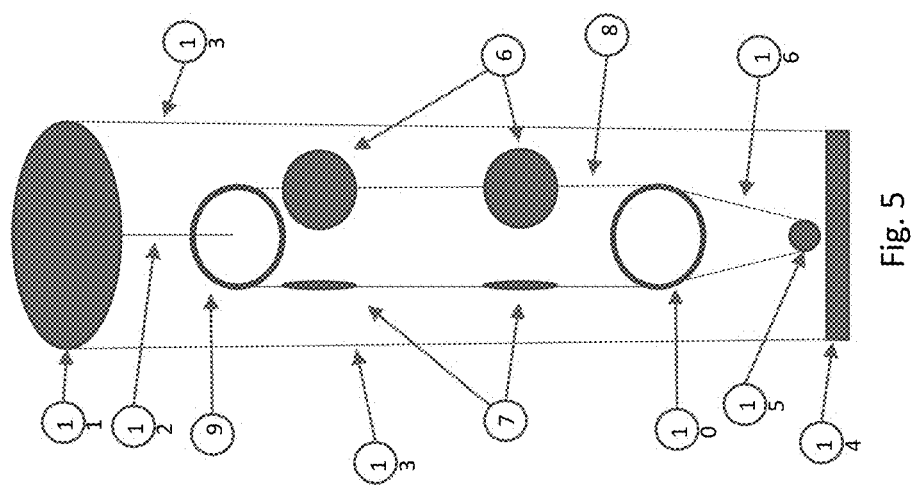
FIG. 5 is a representative figure showing the system with a continuous power loop and a fixed high altitude anchor balloon.

The preferred embodiment representing an example system allowing power generation using four VBMs is shown in FIG. 5. Four VBMs are shown for simplicity but the number of VBM pairs should be maximized to improve power output, operating within weight, space, and desired output limits. Expanded VBMs 6 are paired with contracted VBMs 7. The VBMs 6,7 are connected to and spaced equidistant from one another along a wire loop 8. The wire loop 8 is attached to an upper pully 9 and a lower pulley 10. The upper pully 9 is held at the target altitude using an LTA balloon 11 and upper pulley tether 12. The LTA balloon 11 is held at its targeted altitude using tethers 13 connected to a foundation 14. The lower pully 10 is connected to a ground-based generator 15 using a generator wire loop 16. The generator can be attached to the same foundation 14 at the LTA balloon 11 or an alternate foundation not shown. The buoyant force of the LTA balloon 11 is sufficient to maintain the wire loop 8 taunt and coupled to the two pulleys 9,10, such that if a force is applied to the wire loop 8, the loop 8 and both pulleys 9,10 will rotate. The lower pulley 10 altitude is determined by the length of the wire loop 8. The altitude of the lower pulley 10 can be set near ground level or above the local inversion altitude. The weight of expanded VBMs 6 is counterweighted by the weight of the contracted VBMs 7 through the wire loop 8 and upper pulley 9. Due to the buoyant force on the expanded VBMs 6 the wire loop 8, upper pulley 9, and lower pulley 10, begin to rotate counterclockwise. The rotation of the lower pulley 10 causes the generator wire loop 16 to rotate counterclockwise as well and rotate the electrical generator 15, producing electrical power.

As the expanded VBMs 6 ascend the temperature of the ambient air decreases. Condensation begins when the temperature drops below the boiling point of the contained material 1 which is approximately at the midpoint between the upper pulley 9 and lower pulley 10. The ascent velocity will be set such that the majority of condensation does not occur until the expanded VBMs 6 reaches the upper pully 9 and transitions to the descending side of the wire loop 8. At this point the expanded VBM 6 transitions to a contracted VBM 7. The opposite occurs at the lower pulley with contracted VBMs 7 transitioning to expanded VBMs 6 after crossing the lower pulley 10. The speed of ascent and descent is controlled to prevent significant expansion of contracted VBMs 7 and contraction of expanded VBMs 6 during transit, which would reduce power generation and system efficiency. If the system were stopped the VBMs 6,7 would reach an equilibrium based on ambient air temperatures and the wire loop 8 would cease to move. For this reason, at the start of operations or after maintenance, wire loop 8 rotation must be initiated using an external force to transition expanded VBMs 6 to the ascending side of the wire loop 8. This can be achieved using a motor, LTA balloon, or a weight attached to the descending side of the wire loop 8. The VBMs 6,7 could also be insulated during the ascent and decent phase and the insulation removed when the target altitude is reached.

Optionally the expanding or expanded VBMs 6 would be disconnected from the wire loop 8 and held at the lower altitude until the phase change has occurred and when needed for power generation. This is referred to as parking the VBM. In the same manner the contracting or contracted VBMs 7 would be disconnected from the wire loop 8 and held at the high altitude until ready and required for descent. Expanded VBMs 6 and contracted VBMs 7 would still need to be operated in pairs to maintain the weight balance on the wire loop 8. This option not only ensures that an incomplete phase change does not decrease system efficiency, but also acts as stored energy to be used during peak demand periods and start-up.

Figure 6:
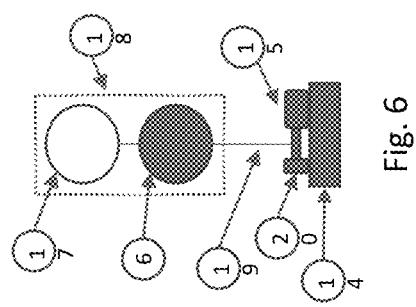
FIG. 6 is a representative figure showing the VBB system in its starting position for ascent.
Figure 7:
FIG. 7 is a representative figure showing the VBB system after ascent but prior to full condensation.
Figure 8:
FIG. 8 is a representative figure showing the VBB system after condensation and ready for descent.
Figure 9:
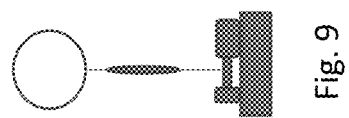
FIG. 9 is a representative figure showing the VBB system after descent but prior to full evaporation.

Another embodiment of the invention is shown in FIGS. 6 through 9. This embodiment consists of a variable buoyancy module 6 or 7 coupled directly with an LTA balloon 17. Together the two form the variable buoyancy balloon or VBB 18. The LTA balloon 17 is sized to support the weight of the VMB 6 or 7 such that the VBB 18 has a positive buoyancy when expanded and a slightly negative to neutral buoyancy when contracted. A tether 19 connects the VBB 18 to a reeling mechanism 20 and an electrical generator 15. The reeling mechanism 20 spools the full length of the tether 19 sized to reach the target altitude. As the VBB 18 ascends the tether 19 is pulled and unwinds from the reeling mechanism 20. The reeling mechanism 20 and electrical generator 15 are connected such that as the reeling mechanism 20 is rotated the electrical generator 15 is rotated and produces power. The reeling mechanism 20 and electrical generator 15 are fixed to a foundation 14 designed for anticipated loads due to normal operations and weather. FIG. 6 shows the system after the evaporation phase and at the start of the ascent phase when power will be produced with an expanded VBM 6 and a buoyant VBB 18. FIG. 7 shows the system after the ascent phase and at the start of the condensation phase. The VBB 18 has fully ascended and reached the targeted altitude or when sufficient contraction in the expanded VBM 6 has occurred and the VBB 18 is insufficiently buoyant to rise further. Power production has ceased. FIG. 8 shows the system after the condensation phase and at the start of the descent phase. Cooling has occurred and the expanded VBM 6 has transitioned to a contracted VBM 7. At this stage the VBB 18 is neutrally or negatively buoyant. The reeling mechanism 20 starts to reel in the tether 19 and VBB 18 using stored energy, power from another ascending VBB 18, or external power. FIG. 9 shows the system after the descent phase and at the start of the evaporation phase. The VBB 18 is fully reeled into a lower altitude, the volatile material in the contracted VBM 7 begins to evaporate at ambient temperatures. After evaporation the system will be ready to ascend and generate power again as shown in FIG. 6.

Figure 10:
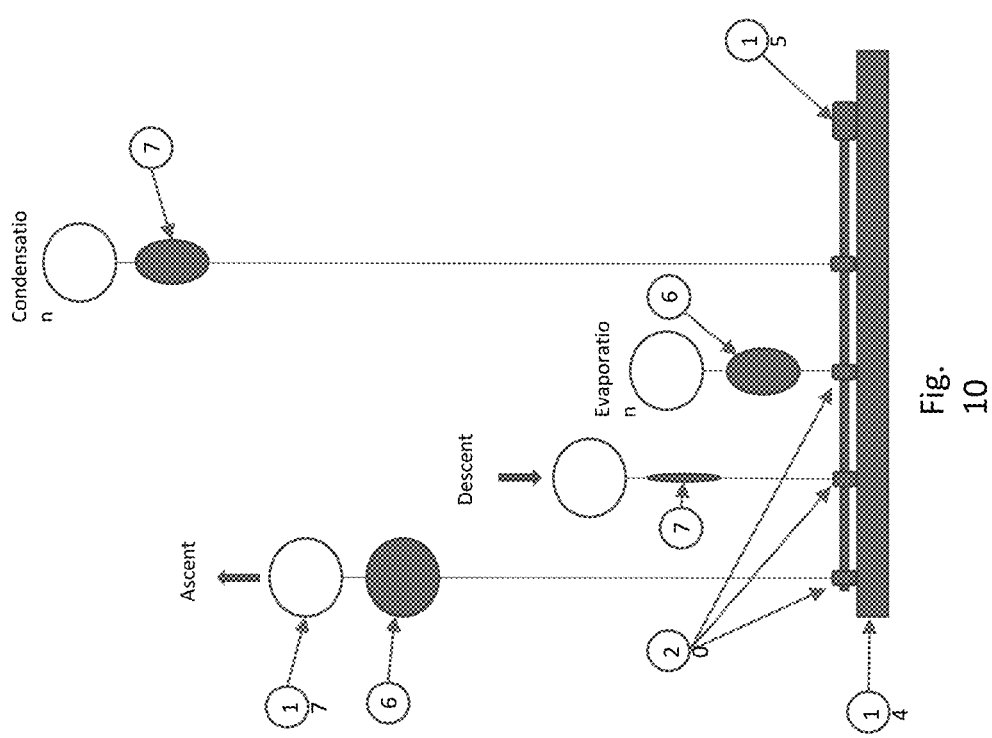
FIG. 10 is a representative figure showing a configuration with multiple VBBs in difference phases of operation.

During the condensation, evaporation, and descent phases the electrical generator 15 can be disconnected from the reeling mechanism 20 such that it continues to rotate. Other VBBs 18 can be connected to the generator 15 and used to generate power continuously. FIG. 10 shows a representative example of this configuration with one VBB 18 in ascent, one in descent, one in evaporation phase preparing for ascent, and another in condensation phase preparing for descent. If the reeling in of the descending VBB 18 is faster than the ascent phase and sufficient time is allowed for condensation and evaporation, power can be generated continuously.

In this embodiment the tether 19 weight can impact system efficiency at higher altitudes. To compensate for this, the LTA balloon 17 can be allowed to expand as air pressure decreases at higher altitudes to minimize buoyancy loss as the VBB 18 ascends. Smaller LTA balloons can also be attached to the tether 19 below the VBB 18 to minimize the tether 19 weight transferred to the VBB 18 and detracting from the power generation.

In another embodiment, heat from geothermal, solar concentrator, or waste heat sources is used to heat the contracted VBM 7 or VBB 18 and generate buoyancy and ambient air is used to cool and condense the expanded VBM 6 or VBB 18. In this embodiment, the height required for system is reduced due to the higher differential temperature.

In another embodiment the upper pulley 9 of the system is supported using a tower or structure instead of an LTA balloon 11. This will be most effective in systems using geothermal or waste heat where a sufficient temperature differential is established over a small elevation gain.

In another embodiment wind energy is used to create an upward force on the expanded VBM 6 or VBB 18 during ascent and a downward force on the contracted VBM 7 or VBB 18 during descent. The additional force will allow an increase in power generation.

The low altitude target can be the ground or an altitude above the temperature inversion point. If placed above the temperature inversion point, the high temperature used for evaporating the contained material 1 will not vary, simplifying design conditions.

The system will have equipment installed to meet all local aviation administration safety requirements, such as the Federal Aviation Administration in the U.S.A. and may be equipped with transponders and other safety equipment like anti-collision strobes and lights.

System may be utilized to generate power on land or at sea.

What is claimed is:

1. A renewable power generating apparatus, comprising:
    a variable buoyancy module, designed to expand and contract as a material contained within the variable buoyancy module evaporates and condenses, displacing atmospheric air and thereby changing the buoyancy of the variable buoyancy module, while preventing leakage of the contained material, allowing efficient heat transfer from the atmosphere to the contained material and maintaining the material's pressure constant;

the contained material sealed within the variable buoyancy module that is maintained at a constant pressure such that the contained material's boiling point is between the atmospheric temperatures of the lowest altitude at which the variable buoyancy module operates and the highest altitude at which the variable buoyancy module operates, such that heat transfer from the atmosphere evaporates the contained material at the lowest altitude and condenses the contained material at the highest altitude;

a cable system traversing the highest and lowest altitudes, connected to the variable buoyancy module, counterbalanced such that the variable buoyancy module ascends when the contained material is evaporated and descends when the contained material is condensed;

a lighter than air balloon connected above the cable system via a tether or directly connected above the variable buoyancy module via a tether;

a power coupling unit connecting the cable system to an electrical generator such that movement of the cable system causes movement of the electrical generator and power generation;

the electrical generator connected to the power coupling unit.

2. The apparatus according to claim 1, wherein the temperature of the environment around the variable buoyancy module at the lowest altitude of operation is increased above the atmospheric temperature using heat from a geothermal, solar, or industrial waste heat source.

3. The apparatus according to claim 1, further comprising a lift device attached to the variable buoyancy module or the cable system to utilize wind energy to create lift on the cable system or the variable buoyancy module and improve energy output.

4. The apparatus according to claim 1, further comprising an insulating sleeve applied to the variable buoyancy module during ascent and descent to prevent evaporation or condensation of the contained material prior to the variable buoyancy module reaching the lowest and the highest altitudes.

5. The apparatus according to claim 1, further comprising a connecting device between the variable buoyancy module and the cable system and a variable buoyancy module holding apparatus, allowing the variable buoyancy module to decouple from the cable system and hold at the lowest altitude or the highest altitude to allow complete evaporation or condensation of the contained material or to control power output prior to reattachment of the variable buoyancy module to the cable system.

6. The apparatus according to claim 1, wherein a ground-based structure is used to support the variable buoyancy module and cable system.

7. The apparatus according to claim 1, further comprising additional lighter than air balloons attached to the cable system and/or the variable buoyancy module.

8. The apparatus according to claim 1, wherein the power coupling unit is connected to a mechanical drive.

* * * * *